(12) United States Patent
Huber et al.

(10) Patent No.: US 10,801,870 B2
(45) Date of Patent: Oct. 13, 2020

(54) SENSOR FOR MEASURING THE MASS FLOW RATE OF A FLOWABLE MEDIUM

(71) Applicant: Endress+Hauser Flowtec AG, Reinach (CH)

(72) Inventors: Christof Huber, Bern (CH); Christian Schütze, Basel (CH); Dieter Mundschin, Liestal (CH); Benjamin Schwenter, Aesch (CH); Severin Ramseyer, Münchenstein (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/618,707

(22) PCT Filed: May 8, 2018

(86) PCT No.: PCT/EP2018/061852
§ 371 (c)(1),
(2) Date: Dec. 2, 2019

(87) PCT Pub. No.: WO2018/219601
PCT Pub. Date: Dec. 6, 2018

(65) Prior Publication Data
US 2020/0124453 A1  Apr. 23, 2020

(30) Foreign Application Priority Data

Jun. 2, 2017  (DE) .......................... 10 2017 112 245

(51) Int. Cl.
*G01F 1/84* (2006.01)
*G01F 15/18* (2006.01)
*G01F 25/00* (2006.01)

(52) U.S. Cl.
CPC .......... *G01F 1/8413* (2013.01); *G01F 1/8472* (2013.01); *G01F 15/18* (2013.01); *G01F 25/0007* (2013.01)

(58) Field of Classification Search
CPC ....................................................... G01F 1/84
See application file for complete search history.

(56) References Cited

U.S. PATENT DOCUMENTS 3,132,512 A * 5/1964 Roth ...................... G01F 1/8481
73/861.355
4,895,031 A * 1/1990 Cage ...................... G01F 1/8409
73/861.355

(Continued)

FOREIGN PATENT DOCUMENTS

DE      3916285 A1   11/1990
DE     19710806 A1   11/1997

(Continued)

*Primary Examiner* — Jewel V Dowtin
(74) *Attorney, Agent, or Firm* — Christopher R. Powers; Endress+Hauser (USA) Holding Inc.

(57) ABSTRACT

A mass flow sensor includes: a vibratory measurement tube bent in a tube plane; a vibration exciter for exciting bending vibrations in a bending vibration use-mode; two vibration sensors for sensing vibrations; a support system having a support plate, bearing bodies on the inlet and sides; and a sensor housing, wherein: the support system has support system vibration modes which include elastic deformations of the support plate; the measurement tube is connected fixedly to the support plate by the bearing body on the inlet side and by the bearing body on the outlet side; and the support plate has a number of spring-loaded bearings exposed through cut-outs in the support plate by which the support plate is mounted on the sensor housing with degrees of vibrational freedom, the natural frequencies of which are lower than a use-mode natural frequency of the bending vibration use-mode.

22 Claims, 3 Drawing Sheets

(56) References Cited

U.S. PATENT DOCUMENTS

| | | | | |
|---|---|---|---|---|
| 5,307,689 A | * | 5/1994 | Nishiyama | G01F 1/8413 73/861.357 |
| 5,705,754 A | * | 1/1998 | Keita | G01F 1/8413 73/861.354 |
| 6,223,605 B1 | | 5/2001 | Koudal et al. | |
| 6,484,591 B2 | * | 11/2002 | Drahm | G01F 1/8413 73/861.355 |
| 7,845,241 B2 | * | 12/2010 | Van Cleve | G01F 1/8409 73/861.355 |
| 9,217,664 B2 | * | 12/2015 | Lanham | G01F 15/14 |
| 2010/0154564 A1 | | 6/2010 | Geest et al. | |

FOREIGN PATENT DOCUMENTS

| | | |
|---|---|---|
| DE | 69633208 T2 | 1/2005 |
| DE | 102010030340 A1 | 1/2011 |
| DE | 102015122146 A1 | 6/2017 |
| EP | 0493825 A2 | 7/1992 |
| EP | 0518124 A1 | 12/1992 |
| EP | 2199756 A1 | 6/2010 |
| WO | 2015076676 A1 | 5/2015 |

\* cited by examiner

SENSOR FOR MEASURING THE MASS FLOW RATE OF A FLOWABLE MEDIUM

CROSS-REFERENCE TO RELATED APPLICATIONS

The present application is related to and claims the priority benefit of German Patent Application No. 10 2017 112 245.1, filed on Jun. 2, 2017, and International Patent Application No. PCT/EP2018/061852 filed on May 8, 2018, the entire contents of which are incorporated herein by reference.

TECHNICAL FIELD

The present invention relates to a sensor for measuring a mass flow rate with a single vibratory measurement tube, wherein the measurement tube is bent in its rest position in a tube plane, wherein the measurement tube has two-fold rotational symmetry with respect to an axis running perpendicular to the tube plane.

BACKGROUND

Generic sensors are described, for example, in the published patent application DE 039 16 285 A1, publication EP 518 124 A1 and the as yet unpublished patent application DE 10 201 5122 146.2. Sensors with a single measurement tube are advantageous in that they do not contain any flow dividers. Unlike sensors having two measurement pipes which vibrate symmetrically relative to one another, however, it is more difficult in the case of sensors having only a single measurement tube to avoid an interaction with the surroundings by decoupling vibrational energy of a bending vibration use-mode or by coupling interfering vibrations from the surroundings. To this end, publication DE 10 2010 030 340 A1 discloses a sensor with a single measurement tube, in which the measurement tube has two parallel-guided loops which vibrate relative to one another and thus balance one another. For this type of sensor, however, due to the course of the measurement tube in loops, a discharge capability of the measurement tube is in principle excluded, while sensors of the generic type can basically be designed to be dischargeable.

As a contribution to avoiding interaction with the surroundings by decoupling vibration energy in a bending vibration use-mode or by coupling interfering vibrations from the surroundings, EP 518 124 A1 describes a frequency separation between the vibrations of the measurement tube and vibrations of other components of the sensor.

SUMMARY

The object of the present invention is to provide a sensor which is as compact as possible and is thereby resistant to interference. The object is achieved according to the invention by the sensor according to independent claim 1.

The sensor according to the invention for measuring the mass flow rate of a flowable medium comprises:

a line inlet section;

a single vibratory measurement tube for guiding the medium, wherein the measurement tube is bent in its rest position in a tube plane;

a line outlet section;

at least one vibration exciter for exciting bending vibrations of the measurement tube in a bending vibration mode;

at least two vibration sensors for detecting vibrations of the measurement tube;

a support system having a support plate, at least one bearing body on the inlet side and at least one bearing body on the outlet side; and a sensor housing, wherein the support system has support system vibration modes comprising elastic deformations of the support plate, wherein the measurement tube is connected to the support plate by means of the bearing body on the inlet side and by means of the bearing body on the outlet side, and is bordered by the bearing bodies, wherein the measurement tube connects on the inlet side to the line inlet section and on the outlet side to the line outlet section and can be connected via the latter to a pipeline, wherein the line inlet section and the line outlet section in each case are firmly connected to the sensor housing, wherein the support plate has a number of, especially, spiral spring-loaded bearings, wherein a spring-loaded bearing is exposed in each case through at least one cut-out in the support plate, wherein the support plate is spring mounted with respect to the sensor housing via the spring-loaded bearing or bearings so as to have three degrees of translational vibration freedom and three degrees of rotational vibration freedom, wherein the natural frequencies of vibrations of the support plate with respect to the meter housing are lower than a use-mode natural frequency of the bending vibration use-mode due to the degrees of translational vibration freedom and the degree of rotational vibration freedom, wherein the use-mode natural frequency is lower than the natural frequencies of the support system vibration modes, wherein the measurement tube has a two-fold rotational symmetry with respect to an axis which runs perpendicular to the tube plane, wherein the bearing bodies are positioned such that the use-mode natural frequency has a frequency interval from the next natural frequency of another vibration mode of the measurement tube, which does not fall below a frequency interval limit value, and wherein the frequency interval limit value is at least 2%, especially, at least 4% and preferably at least 8% of the use-mode natural frequency.

In addition to the frequency separation between the vibration modes of the measurement tube on the one hand and the support system vibration modes or vibrations of the support plate with respect to the sensor housing on the other hand, the positioning of the bearing bodies is thus achieved by arranging such that interfering vibration modes of the measurement tube have at most a negligible impact on the bending vibration use-mode.

Although the bending vibration use-mode is preferably a vibration mode in which the measurement tube vibrates perpendicular to the tube plane, all vibration modes of the measurement tube are also significant in determining the frequency intervals, that is to say, those with vibrations in the tube plane as well as those with vibrations perpendicular to the tube plane.

Suitable positions of the bearing bodies can be determined, for example, by position-dependent determination of the natural frequencies of vibration modes of the measurement tube by means of FEM simulation.

The especially spiral spring-loaded bearings decouple all vibration modes between the sensor housing and the support plate in the frequency range of the bending vibration use-mode with little effort, irrespective of the direction of vibration. This constitutes a considerable advantage over cantilever support springs, as disclosed in WO 2015/076 676 A1. This is because such cantilever support springs actually only permit displacements perpendicular to the plane of the support plate. Vibrations in the plate plane cannot, therefore, be decoupled by such cantilever supports.

In a further development of the invention, a calibration factor (CalF) describes in a first approximation a proportionality between a mass flow through the measurement tube and a phase difference between vibrations of the measurement tube vibrating in the bending vibration use-mode at the location of the two vibration sensors, wherein an evaluation function, which is proportional to the frequency interval and inversely proportional to the use-mode natural frequency and to the calibration factor CalF, has a local or, especially, absolute maximum, wherein the bearing bodies are positioned such that the evaluation function falls below the value of the maximum by not more than 8%, in particular not more than 4%, and preferably not more than 2%. The calibration factor CalF dependent on the bearing body position can for example be ascertained by FEM simulation.

This evaluation function enables a balanced consideration of robustness against interfering vibrations on the one hand and of greater measuring sensitivity on the other hand when designing the sensor. This is particularly noticeable with regard to a compact sensor design, about which further aspects are mentioned below.

In a further development of the invention, the bending vibration use-mode is an F3 bending vibration mode in which the measurement tube vibrates perpendicular to the tube plane. In this vibration mode, the integral of the acceleration along the measurement tube is minimal. Inasmuch as the F3 bending vibration mode also has the two-fold symmetry of the measurement tube, on the whole no torques are still exerted on the bearing bodies. In effect, therefore, at most negligible portions of the vibration energy can be dissipated via the bearing blocks. Accordingly, the F3 bending vibration mode is also scarcely disturbed by external vibrations.

In a further development of the invention, the natural frequencies of vibrations of the support plate relative to the meter housing are at most half the use-mode natural frequency of the bending vibration use-mode due to the degrees of translational vibration freedom and the degrees of rotational vibration freedom, wherein the support system natural frequency is at least double the use-mode natural frequency.

In a further development of the invention, the number of spring-loaded bearings is 1, 2, 3 or 4. The embodiment with four spring-loaded bearings is preferred at present since in this way a mounting of the support plate corresponding to the two-fold rotational symmetry of the measurement tube can be realized in a simple manner by arranging the springs accordingly. In principle, this is also possible with only two springs, but in this case manufacturing tolerances have a greater impact when the springs in the support plate are exposed.

In a further development of the invention, the measurement tube has an S-shaped course, wherein a longitudinal direction (z) exists in the tube plane, to which the pipeline axis has at no point an angle of more than 85°, especially no more than 83°. Especially with a vertical orientation of the longitudinal direction, the discharge capability of the measurement tube is thus ensured.

In a further development of the invention, the measurement tube between the two bearing bodies has two external straight sections and a central straight section, which are connected by two arcuate (e.g., circular) sections, wherein the two bearing bodies are arranged on the external straight sections in each case.

The axis of the two-fold rotational symmetry runs through the central straight section. The line inlet section or the line outlet section is connected to the external straight sections.

By arranging the bearing bodies on the external straight sections, a construction which is particularly compact in the longitudinal direction is realized in deviation from the sensors according to the prior art. Inasmuch as this tends to lead to an increased rigidity of the measurement tube with respect to the Coriolis mode superimposed on the bending vibration use-mode, this initially effects a higher calibration factor (CalF). However, the aforementioned evaluation function comes into effect here, with which this disadvantageous consequence of the compact design can be at least partially compensated for.

In a further development of the invention, in each case an angle bisector extends between tube center axes of the central straight section and of one of the external straight sections, wherein the vibration sensors are mounted on the measurement tube in each case between an intersection point of one of the angle bisectors with the measurement tube and a point on the external straight section of the measurement tube, which is removed by a radius of curvature of the arcuate section from the transition of the arcuate section to the external straight section.

In a further development of the invention, the line inlet section and the line outlet section contribute, in addition to the spring or springs, to a benchmark specific to the degree of freedom in each case in relation to the degrees of translational vibration freedom and the degrees of rotational vibration freedom of the support plate with respect to the sensor housing, wherein a contribution of the line inlet section deviates from a corresponding contribution of the line outlet section in each case by not more than 10%, and especially not more than 5%, of the respectively smaller contribution.

In a further development of the invention, the common contribution of the line inlet section and the line outlet section contributes to any of the benchmarks specific to the degree of freedom by more than 40%, especially not more than 20%, and preferably not more than 10%.

In a further development of the invention, the line inlet section and the line outlet section have substantially the same tube cross section as the measurement, in particular the same tube material as the measurement tube, and are preferably manufactured in one piece with the measurement tube.

In a further development of the invention, the natural frequencies of the degrees of translational vibration freedom and degrees of rotational vibration freedom of the support plate are not less than 70 Hz, especially not less than 100 Hz, and/or not more than 400 Hz. This ensures that typical interfering vibrations of technical installations cannot excite the support plate to vibrate.

In a further development of the invention, an angular bisector (w1, w2) extends between a tube center axis of the central straight section and a tube center axis of one of the external straight sections, wherein a coordinate system having a z-axis in the tube plane arises, which runs perpendicular to the angle bisectors (w1, w2), wherein the axis of the two-fold rotational symmetry forms the x-axis, wherein an y-z plane spanned by the x-axis and the z-axis intersects the external straight sections at a distance from the bearing bodies.

In a further development of the invention, the vibration exciter is arranged in the center of the two-fold rotational symmetry, and wherein the vibration exciter is set up to excite bending vibrations perpendicular to the tube plane.

In a further development of the invention, an angle bisector runs in each case between a tube center axis of the central straight section and a tube center axis of one of the external straight sections, wherein a coordinate system having a z-axis in the tube plane arises, which runs perpendicular to the angle bisectors, wherein the axis of the two-fold rotational symmetry forms the x-axis, wherein the y-axis runs parallel to the angle bisectors through the intersection point of the x-axis and y-axis, wherein a characteristic basal plane of the measurement tube is defined by a right angle whose sides on the one hand run in the z-direction through an intersection point of one of the angle bisectors with the tube axis of a bent section and on the other hand in the y direction through an intersection point of one of the bearing bodies with the tube axis of the measurement tube, wherein the ratio of the rectangular area to the inner diameter of the measurement tube is not more than 8,000, especially not more than 6,000, and preferably not more than 5,000.

In a further development of the invention, the internal diameter of the measurement tube is not more than 5 mm.

BRIEF DESCRIPTION OF THE DRAWINGS

The invention will now be explained on the basis of the exemplary embodiments shown in the drawings. Shown are.

DETAILED DESCRIPTION

Figure 1:
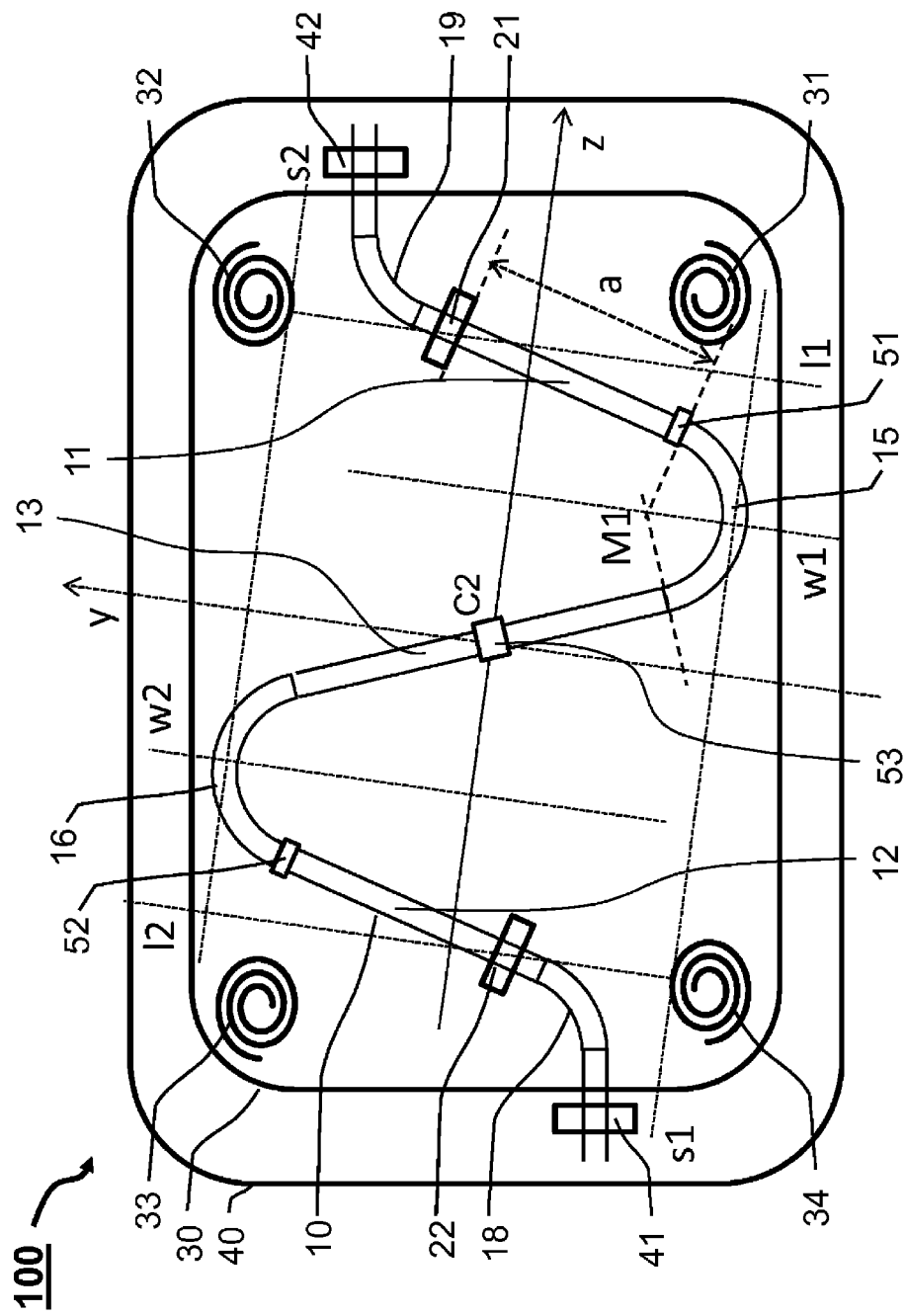
FIG. 1 shows a plan view of a first exemplary embodiment of a sensor according to the present disclosure.

The sensor 100 comprises a measurement tube 10 having a first straight external section 11, a second straight external section 12, and a central straight section 13, as well as a first bent section 15 and a second bent section 16. The two straight external segments 11, 12 are each connected to the central straight section 13 by means of one of the bent sections 15, 16. The measurement tube 10 is bordered by two bearing bodies 21, 22 and fastened to the latter on a rigid support plate 30. The measurement tube 10 runs substantially in a tube plane parallel to the support plate 30. The measurement tube has a two-fold rotational symmetry about an axis of symmetry which runs perpendicular to the tube plane through a point C2 in the center of the central tube section. The measurement tube has an internal diameter of 5 mm or less, for example. It is made of a metal, in particular stainless steel or titanium. The metallic support plate 30 has a thickness of 5 mm, for example. The support plate 30 has four spiral spring-loaded bearings 31, 32, 32, 33, 34, which in particular are cut out by means of a laser, and which likewise have the two-fold rotational symmetry relative to each other with respect to the axis of symmetry through the point C2. With bearing bolts, not shown here, which are fixed in the center of the spring-loaded bearings, the support plate 30 is anchored to a housing plate 40 of a sensor housing.

Figure 3:
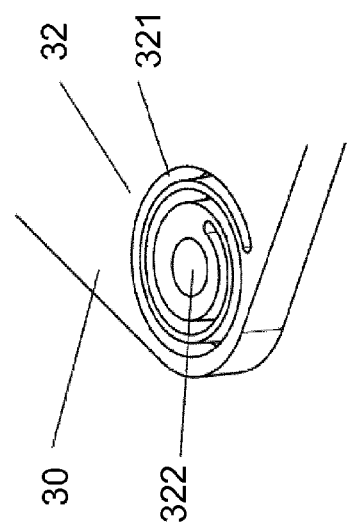
FIG. 3 shows a detail view of a spring-loaded bearing of a sensor according to the present disclosure.

A spring-loaded bearing 32 is shown in detail in FIG. 3. The effective rigidity of the spring-loaded bearing 32 results from the length of the spiral cut-out 321 and its width relative to the width of the remaining material of the support plate 30. In the center, the spring-loaded bearing 32 has a bore 322 for receiving a bearing pin.

Figure 4:
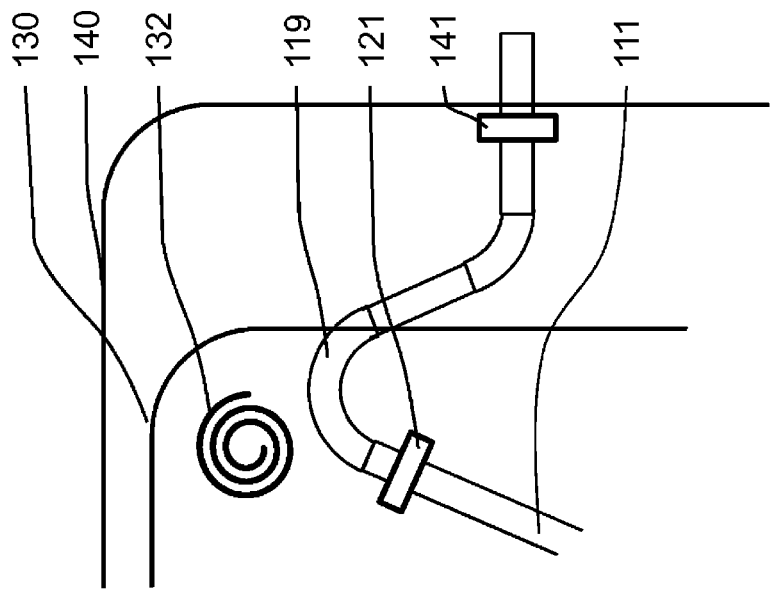
FIG. 4 shows a detailed view of an inlet or outlet section of an exemplary embodiment of a sensor according to the present disclosure.

By means of the spring-loaded bearings 31, 32, 33, 34, the support plate 30 has three degrees of translational vibration and three degrees of rotational vibration freedom, the natural frequencies of which are at least 70 Hz in order to avoid resonance vibrations, with vibrations of up to 50 Hz frequently occurring in process plants. In order not to impair the soft suspension of the support plate achieved by the spring-loaded bearings 31, 32, 33, 34, the measurement tube can be connected to a pipeline via a sufficiently soft line inlet section 18 and a sufficiently soft line outlet section 19. The housing has first and second housing bearings 41 42, which are firmly connected to the housing plate 40 and to which the line inlet section 18 and the line outlet section 19 are fixed in order to suppress transmission of vibrations of the pipeline to the measurement tube via the line inlet section 18 and the line outlet section 19. The degrees of translational and rotational vibration freedom of the support plate 30 each have natural frequencies $f_i$ which are proportional to the root of a quotient comprising a benchmark $k_i$ and an idleness term $m_i$, that is to say $f_i \propto (k_i/m_i)^{1/2}$. In sum, the line inlet section 18 and the line outlet section 19 contribute not more than 10% to the respective benchmark $k_i$. In FIG. 1, the line inlet section 18 and the line outlet section 19 are shown substantially schematically. FIG. 4 shows a design of a line outlet section 119 in which the rigidity and thus the contribution to the respective benchmarks is reduced by additional tube length and bends. The line inlet section is correspondingly designed symmetrical thereto.

As further illustrated in FIG. 1, the sensor 100 has a first electrodynamic vibration sensor 51 and a second electrodynamic vibration sensor 52 for detecting the vibrations of the measurement tube. In this case, the two vibration sensors 51, 52 are each arranged on one of the two straight external sections 11, 12 no more than a radius of curvature of the bent sections 15, 16 from the adjacent bent section. In order to excite bending vibrations, the sensor 100 has an electrodynamic exciter 53 which is arranged in the center C2 of the two-fold rotational symmetry and acts in the direction of the axis of symmetry.

The center C2 is the origin of a coordinate system for describing further aspects of the invention. The measurement tube lies in an x-z plane, wherein the y-axis runs parallel to angle bisectors w1, w2, which each extend between a tube axis of the straight external segments 11, 12 and the tube axis of the central straight section 13. The z-axis runs perpendicular to the y-axis in the tube plane and defines a longitudinal axis of the sensor 100. If this longitudinal axis is arranged perpendicularly, the sensor can be discharged optimally. The inclination of the straight sections is then equal to half the angle between a tube axis of the straight external sections 11, 12 and the tube axis of the central straight section 13. In the preferred exemplary embodiment of the invention, this inclination is 7°.

Figure 2:
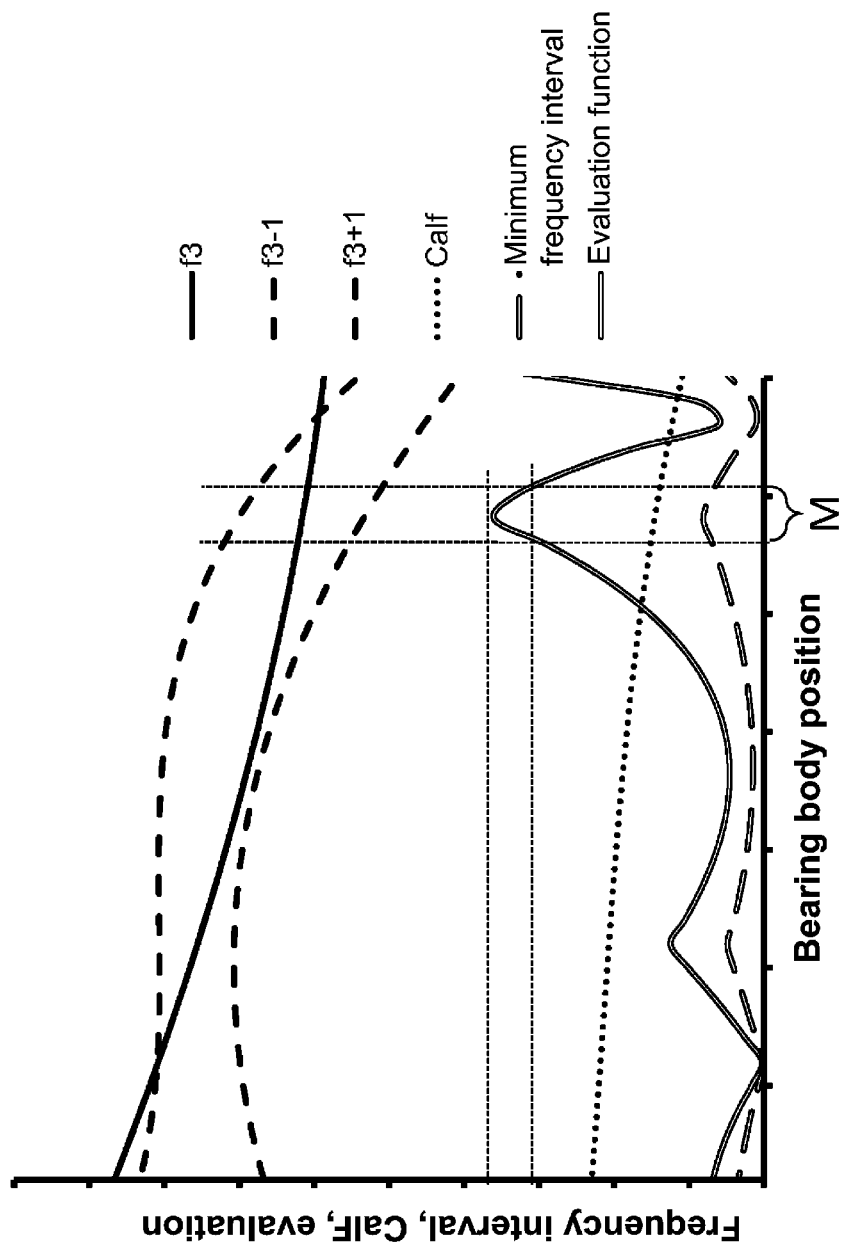
FIG. 2 shows a diagram relating to aspects of an evaluation function.

With regard to positioning the bearing bodies, reference is now made to FIG. 2, which shows an evaluation function and its components. To set up the evaluation function, the natural frequencies of vibration modes of the measurement tube for different bearing body positions are first determined by numerical simulation. The result is shown here for the bending vibration use-mode F3 and the bending vibration modes F3−1 and F3+1 adjacent to the natural frequencies.

Furthermore, a calibration factor CalF:=(dm/dt)/dφ for the various bearing body positions is determined by means of numerical simulation, which describes the relationship between a mass flow rate and a flow-dependent phase difference between the sensor signals of the vibration sensors. The evaluation function is then calculated as a quotient from the minimum frequency interval between the bending vibration use-mode to an adjacent vibration mode and the calibration factor CalF. An optimum position of the bearing bodies in which the evaluation function has a maximum is used for orientation for the actual positioning of the bearing body. The optimum position can be deviated from if, as a result, the value of the evaluation function is undershot by not more than 2%. In the exemplary embodiment shown, the position of the bearing bodies 21, 22 is defined by means of the evaluation function such that the z-axis of the measurement tube intersects the external straight sections 11, 12 of the measurement tube at a distance from the bearing bodies 21, 22. In summary, an interference-resistant sensor having a compactly guided measurement tube has been realized.

The invention claimed is:

1. A vibration sensor for measuring the mass flow rate of a flowable medium, the sensor comprising:
   a vibratory measurement tube structured to guide the medium therethrough, the measurement tube having an inlet end and an outlet end, wherein the measurement tube is bent in a rest position between the inlet end and the outlet end in a tube plane;
   a line inlet section;
   a line outlet section;
   at least one vibration exciter configured to excite bending vibrations of the measurement tube in a bending vibration use-mode;
   two vibration sensors configured to detect vibrations of the measurement tube;
   a support system including a support plate, an inlet bearing body at an inlet side of the support plate and an outlet bearing body on an outlet side of the support plate, the support system having support system vibration modes comprising elastic deformations of the support plate; and
   a sensor housing, wherein:
      the measurement tube is fixedly connected to the support plate via the inlet bearing body and the outlet bearing body and is bordered by the inlet and outlet bearing bodies;
      the measurement tube is connected to the line inlet section at the inlet end and to the line outlet section at the outlet end and is configured to be connected to a pipeline via the line inlet section, the line outlet section or both;
      the line inlet section and the line outlet section are each fixedly connected to the sensor housing;
      the support plate includes a number of spring-loaded bearings formed therein, wherein each spring-loaded bearing is formed in the support plate by at least one cut-out in the support plate;
      the support plate is spring-mounted with respect to the sensor housing via the number of spring-loaded bearings such that the support plate has three degrees of translational vibration freedom and three degrees of rotational vibration freedom;
      natural frequencies of vibrations of the support plate with respect to the sesnor housing are lower than a use-mode natural frequency of the bending vibration use-mode due to the degrees of translational vibration freedom and the degree of rotational vibration freedom;
      the use-mode natural frequency is lower than natural frequencies of the support system vibration modes;
      the measurement tube has a substantially two-fold rotational symmetry with respect to an axis extending perpendicular to the tube plane;
      the inlet bearing body and the outlet bearing body are positioned such that the use-mode natural frequency has a frequency interval from a next natural frequency of another vibration mode of the measurement tube that does not fall below a frequency interval limit value; and
      the frequency interval limit value is at least 2% of the use-mode natural frequency.

2. The sensor of claim 1, wherein a calibration factor describes in a first approximation a proportionality between a mass flow through the measurement tube and a phase difference between vibrations of the measurement tube vibrating in the bending vibration use-mode at each location of the two vibration sensors, wherein an evaluation function, which is proportional to the frequency interval and inversely proportional to the use-mode natural frequency and to the calibration factor, has a local or absolute maximum, wherein the inlet and outlet bearing bodies are positioned such that the evaluation function is below the value of the maximum by not more than 8%.

3. The sensor of claim 2, wherein the inlet and outlet bearing bodies are positioned such that the evaluation function is below the value of the maximum by not more than 2%.

4. The sensor of claim 1, wherein the bending vibration use-mode is an F3 bending vibration mode.

5. The sensor of claim 1, wherein the natural frequencies of vibrations of the support plate relative to the sensor housing are at most half the use-mode natural frequency of the bending vibration use-mode due to the degrees of translational vibration freedom and the degrees of rotational vibration freedom, and wherein the natural frequency of the support system is at least double the use-mode natural frequency.

6. The sensor of claim 1, wherein the number of spring-loaded bearings is 1, 2, 3 or 4.

7. The sensor of claim 1, wherein the measurement tube has a generally S-shaped course, wherein a longitudinal direction in the tube plane has at no point an angle of more than 85° to a longitudinal axis of the pipeline axis.

8. The sensor of claim 7, wherein the measurement tube between the inlet and outlet bearing bodies included two external straight sections and a central straight section, which are connected by two arcuate sections, wherein the inlet and outlet bearing bodies are each arranged on one of the external straight sections, respectively.

9. The sensor of claim 8, wherein an angle bisector extends between tube center axes of the central straight section and each of one of the external straight sections, wherein each of the vibration sensors are mounted on the measurement tube between an intersection point of one of the angle bisectors with the measurement tube and a point on the corresponding external straight section of the measurement tube, which is removed by a radius of curvature of the corresponding arcuate section from a transition of the corresponding arcuate section to the corresponding external straight section.

10. The sensor of claim 8, wherein an angular bisector extends between a tube center axis of the central straight section and a tube center axis of one of the external straight sections, wherein a coordinate system having a z-axis in the tube plane arises, which extends perpendicular to the angle bisectors, wherein the axis of the two-fold rotational symmetry forms the x-axis, and wherein a y-z plane spanned by the x-axis and the z-axis intersects the external straight sections at a distance from the inlet and outlet bearing bodies.

11. The sensor of claim 8, wherein an angle bisector extends in each case between a tube center axis of the central straight section and a tube center axis of one of the external straight sections, wherein a coordinate system having a z-axis in the tube plane arises, which extends parallel to the angle bisectors, wherein the axis of the two-fold rotational symmetry forms the x-axis, wherein the y-axis extends parallel to the angle bisectors through an intersection point of x-axis and y-axis, wherein a characteristic basal plane of the measurement tube is defined by a right angle whose sides extend in a z-direction through an intersection point of the angle bisectors with the tube axis of one of the arcuate sections and in a y-direction through an intersection point of one of the inlet and outlet bearing bodies with the tube axis of the measurement tube, wherein the ratio of a rectangular area to an inner diameter of the measurement tube is not more than 8000.

12. The sensor of claim 11, wherein the ratio of a rectangular area to an inner diameter of the measurement tube is not more than 5000.

13. The sensor of claim 1, wherein the vibration exciter is disposed in a center of the two-fold rotational symmetry, and wherein the vibration exciter is configured to excite bending vibrations perpendicular to the tube plane.

14. The sensor of claim 1, wherein the line inlet section and the line outlet section contribute, in addition to the spring-loaded bearings, to a benchmark specific to the degree of freedom in each case in relation to the degrees of translational vibration freedom and the degrees of rotational vibration freedom of the support plate with respect to the sensor housing, wherein a contribution of the line inlet section deviates from a corresponding contribution of the line outlet section by not more than 10% of the respectively smaller contribution.

15. The sensor of claim 14, wherein the contribution of the line inlet section deviates from the corresponding contribution of the line outlet section in each case by not more than 5% of the respectively smaller contribution.

16. The sensor of claim 14, wherein a common contribution of the line inlet section and the line outlet section contributes to either of the benchmarks specific to the degree of freedom by not more than 40%.

17. The sensor of claim 16, wherein a common contribution of the line inlet section and the line outlet section contributes to either of the benchmarks specific to the degree of freedom by not more than 10%.

18. The sensor of claim 1, wherein the line inlet section and the line outlet section have substantially the same tube cross-section as the measurement tube, are made of the same material as the measurement tube, and are manufactured in one piece, integral with the measurement tube.

19. The sensor of claim 1, wherein natural frequencies of the degrees of translational vibration freedom and the degrees of rotational vibration freedom of the support plate are not less than 70 Hz and/or not more than 400 Hz.

20. The sensor of claim 1, wherein the measurement tube has an inner diameter of not more than 5 mm.

21. The sensor of claim 1, wherein each of the spring-loaded bearings of the support plate is sprial-shaped.

22. The sensor of claim 1, wherein the frequency interval limit value is at least 8% of the use-mode natural frequency.

* * * * *